(12) United States Patent
Whitty

(10) Patent No.: US 7,133,219 B1
(45) Date of Patent: Nov. 7, 2006

(54) TELESCOPIC SIGHTING DEVICE WITH VARIABLE EXIT PUPIL

(75) Inventor: James R. Whitty, Midland (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/126,818

(22) Filed: May 11, 2005

(51) Int. Cl.
*G02B 9/08* (2006.01)
*F41G 1/00* (2006.01)

(52) U.S. Cl. .................. 359/740; 359/674; 42/111; 42/133

(58) Field of Classification Search ........ 359/739–741, 359/672, 674
See application file for complete search history.

(56) References Cited

U.S. PATENT DOCUMENTS

| | | | | |
|---|---|---|---|---|
| 5,499,072 A | * | 3/1996 | Nanjo | 396/378 |
| 5,576,892 A | * | 11/1996 | Hotta et al. | 359/696 |
| 5,796,514 A | * | 8/1998 | Chipper | 359/354 |
| 6,271,975 B1 | * | 8/2001 | Grupp | 359/721 |
| 6,310,732 B1 | * | 10/2001 | Ohno | 359/689 |
| 6,560,036 B1 | * | 5/2003 | Takahashi et al. | 359/688 |

* cited by examiner

*Primary Examiner*—Jordan M. Schwartz
(74) *Attorney, Agent, or Firm*—William D. Schubert; Karl A. Vick

(57) ABSTRACT

A sighting device includes a fixed-position objective lens group lying on an optical axis, an eyepiece lens group lying on the optical axis, and a variable-position objective lens group lying on the optical axis and positioned between the fixed-position objective lens group and the eyepiece lens group. A variable-lens position of the variable-position objective lens group relative to the fixed-position objective lens group or the eyepiece lens group may be controllably varied. A mechanical aperture stop lies on the optical axis between the fixed-position objective lens group and the eyepiece lens group. A stop axial position and/or a stop size of the mechanical aperture stop may be varied according to the position of the variable-position objective lens group.

16 Claims, 3 Drawing Sheets

TELESCOPIC SIGHTING DEVICE WITH VARIABLE EXIT PUPIL

This invention relates to a sighting device such as a rifle sight, and more particularly to such a sighting device where the magnification and the exit pupil of the sighting device may be controllably varied.

BACKGROUND OF THE INVENTION

A rifle or other hand-held weapon which is aimed at a target is provided with a sight that aids the user in aligning the weapon with the target. The weapon may be provided with a telescopic sight which includes a variable lens group that may be controlled by the user to change the magnification and field of view of the sight, between a lower magnification with a wider field of view, and a higher magnification with a narrower field of view. In either case, light enters the sight through an entrance pupil and passes through an exit pupil that defines the size of the image viewed by the user. The exit pupil may be defined by the diameters of the lenses, or, more commonly, by an aperture stop.

To use the sight properly, the user's eye must be aligned with the exit pupil in order to see the image produced by the sight, and must be at the eye relief distance behind the exit pupil. If the user's eye is not aligned with the exit pupil, none or only a portion of the image is visible to the eye.

The telescopic sight is typically used at the lower magnifications for short-range, close-quarters situations, and at the higher magnifications for long-range situations. The telescopic sight in its lower-magnification configuration may also be initially used in long-range situations to locate the target, and then the sight switched to the higher magnification for precise aiming.

Experience has shown that it can be difficult for the user to acquire (locate) the target at different magnifications of the telescopic sight, and to keep the target under surveillance as the telescopic sight is switched between different magnifications. There is a need for an improved approach to such a telescopic sight that overcomes such problems. The present invention fulfills this need, and further provides related advantages.

SUMMARY OF THE INVENTION

The present invention provides a variable-magnification (and field of view) telescopic sighting device, such as used for rifles and other aimed weapons. The exit pupil of the sighting device is varied as the magnification of the sighting device is varied, so that the location and the size of the exit pupil are optimized for the selected magnification of the sighting device. This approach allows the user of the weapon and the sighting device to acquire a target more easily while maintaining the view through the exit pupil, and to maintain the target in view as the magnification is changed.

In accordance with the invention, a sighting device comprises a fixed-position objective lens group lying on an optical axis, an eyepiece lens group lying on the optical axis, and a variable-position objective lens group lying on the optical axis and positioned between the fixed-position objective lens group and the eyepiece lens group. A variable-lens position of the variable-position objective lens group relative to the fixed-position objective lens group and/or the eyepiece lens group may be controllably varied. The variable-position objective lens group may be, for example, a zoom lens group or a tumbler lens group. A mechanical aperture stop lies on the optical axis between the fixed-position objective lens group and the eyepiece lens group. A stop axial position along the optical axis or a stop size perpendicular to the optical axis of the mechanical aperture stop is varied according to the position of the variable-position objective lens group.

Preferably, the stop axial position and/or the stop size of the mechanical aperture stop, and the variable-lens position, may both be changed automatically and in a coordinated manner responsive to a user-operated magnification control. This automatic changing is preferably accomplished by a mechanical linkage or mechanical structure that varies both the stop axial position and/or the stop size of the mechanical aperture stop, and the variable-lens position, in a coordinated manner responsive to the user-operated magnification control. Alternatively and less preferably, the present approach may provide for controlling the stop axial position and/or stop size of the mechanical aperture stop independently of the variable-lens position. Microprocessor control may also be used if desired.

There is preferably a housing in which the fixed-position objective lens group, the eyepiece lens group, the variable-position objective lens group, and the mechanical aperture stop are mounted. A magnification control, which establishes the stop axial position and/or the stop size of the mechanical aperture stop, and the variable-lens position, is manually accessible outside of the housing.

Stated alternatively, in one embodiment a sighting device comprises a fixed-position objective lens group lying on an optical axis, an eyepiece lens group lying on the optical axis, and a variable-position objective lens group lying on the optical axis and positioned between the fixed-position objective lens group and the eyepiece lens group. A variable-lens position of the variable-position objective lens group relative to the fixed-position objective lens group or the eyepiece lens group may be controllably varied. An aperture stop structure lies on the optical axis between the fixed-position objective lens group and the eyepiece lens group. An exit pupil is the image of the aperture stop structure. A pupil axial position and/or a pupil size of the aperture stop structure is varied according to the position of the variable-postion objective lens group.

The present approach permits the pupil axial position and/or the pupil size of the exit pupil to be varied according to the selected magnification of the telescopic sighting device. The exit pupil properties are therefore matched to the selected magnification, rather than being restricted to a single compromise value. Acquisition of the target and maintaining sight of the target are therefore made easier for the user of the sighting device. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 7–8 are schematic views of a practical switchable configuration of a tumbler sighting device, wherein FIG. 7 illustrates a configuration with the variable-position objective lens group and the exit stop in the first stop axial position, and FIG. 8 illustrates a configuration with the variable-postion objective lens group and the exit stop in the second stop axial position.

DETAILED DESCRIPTION OF THE INVENTION

Figure 1:
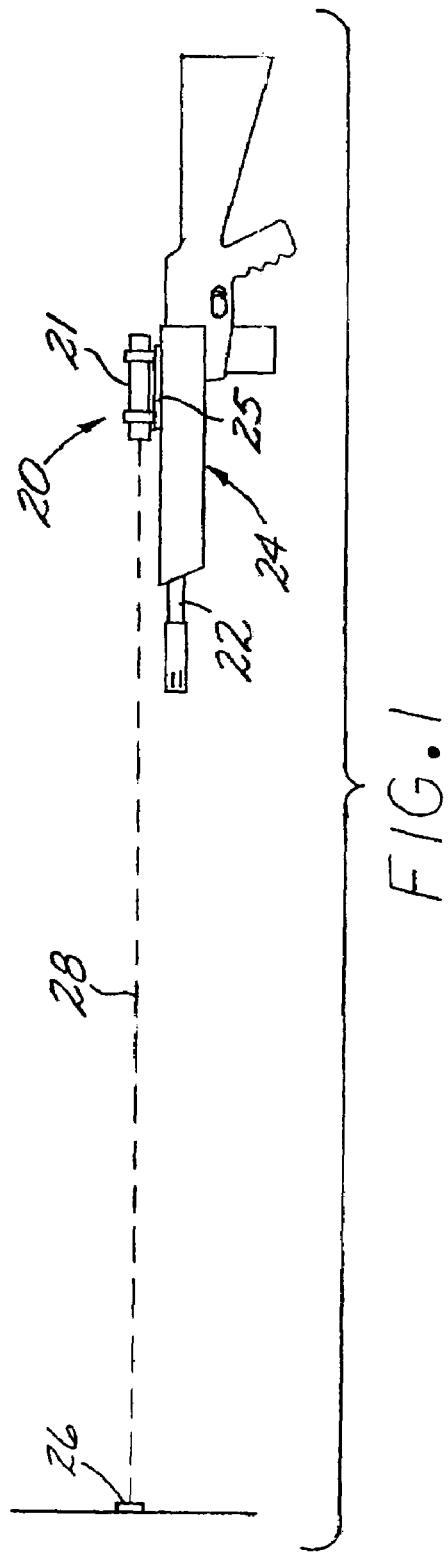
FIG. 1 is a schematic elevational view of a sighting device affixed to a rifle barrel.

FIG. 1 depicts a sighting device 20 including an elongated housing 21 that is affixed to a barrel 22 (in this case through the barrel-support) of a rifle 24 with an adjustable attachment 25 that allows the entire sighting device 20 to be moved as a unit relative to the barrel 22. The user of the rifle 24 aims the rifle 24 and the sighting device 20 at a distant target 26 along a line of sight, which is also the optical axis 28 of the sighting device 20. The sighting device 20, which typically includes telescopic optics, aids the user in aiming the rifle 24 at the target 26 of interest.

FIGS. 2–3 and 4–5 respectively illustrate two preferred embodiments of the optics that may be used within the housing 21. In each case, the sighting device 20 includes a fixed-position objective lens group 30 lying on the optical axis 28, an eyepiece lens group 32 lying on the optical axis 28, and a variable-position objective lens group 34 lying on the optical axis 28, all mounted within the housing 21. (There may also be an inverting lens group to invert the image of the objective lenses, but it is not pertinent to the present invention and is not illustrated.) Each of these lenses is termed a "lens group", and may include one or more lenses. That is, the fixed-position objective lens group 30 may include one or more than one lens, the eyepiece lens group 32 may include one or more than one lens, and the variable-postion objective lens group 34 may include one or more than one lens. The objective lens groups 30 or 34 may include magnification and inversion lenses, for example. The variable-position objective lens group 34 is positioned between the fixed-postion objective lens group 30 and the eyepiece lens group 32 along the optical axis 28. The present approach is compatible with other features of conventional sighting devices such as manual adjustments to the lateral positions of the various lenses to aid in the fine adjustment of the lens positions and the aiming of the optical axis 28.

Figure 2:
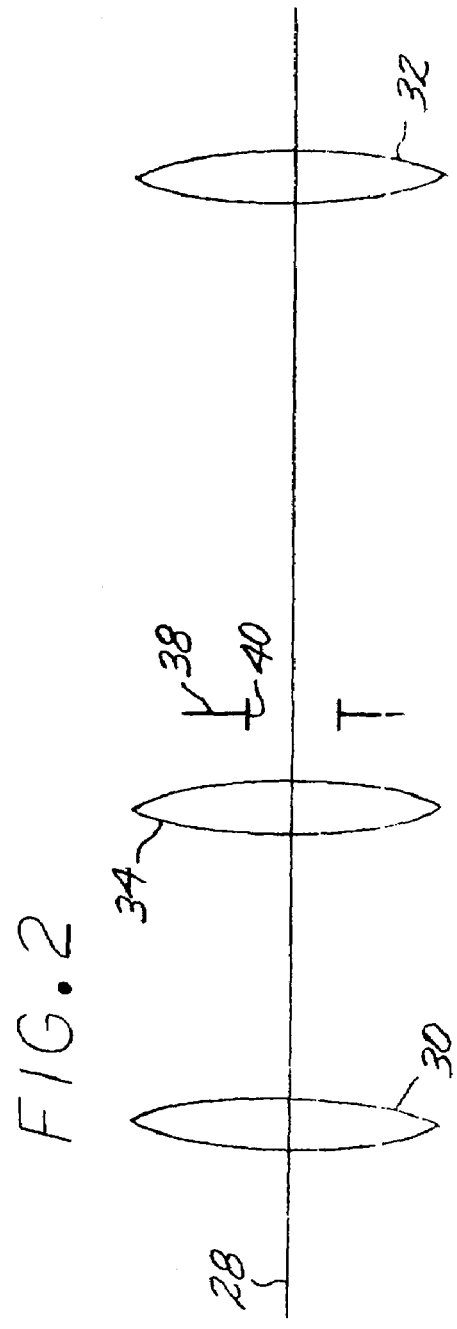
FIG. 2 is a schematic elevational view of the optics of a zoom sighting device with the variable-position objective lens group and the aperture stop in a first stop axial position.
Figure 3:
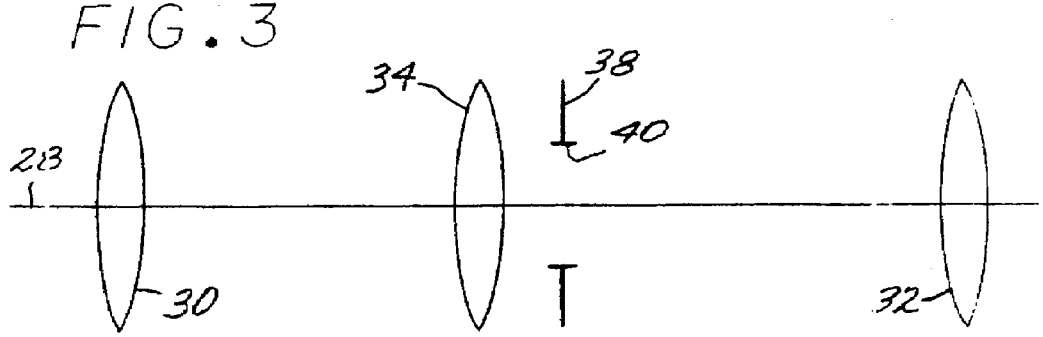
FIG. 3 is a schematic elevational view of the optics of FIG. 2 with the variable-position objective lens group and the exit stop in a second stop axial position.

The variable-position objective lens group 34 comprises the lenses whose relative position with respect to the fixed-postion objective lens group 30 and the eyepiece lens group 32 may be controllably varied to change the magnification of the sighting device 20. For a zoom-lens-group embodiment of FIGS. 2–3, the variable-position objective lens group 34 moves along the optical axis 28 relative to the fixed-postion objective lens group 30 and/or the eyepiece lens group 32. FIGS. 2–3 show two positions of the variable-position objective lens group 34 relative to the eyepiece lens group 32, but the positions may be continuously adjustable to achieve a continuous range of magnifications.

Figure 4:
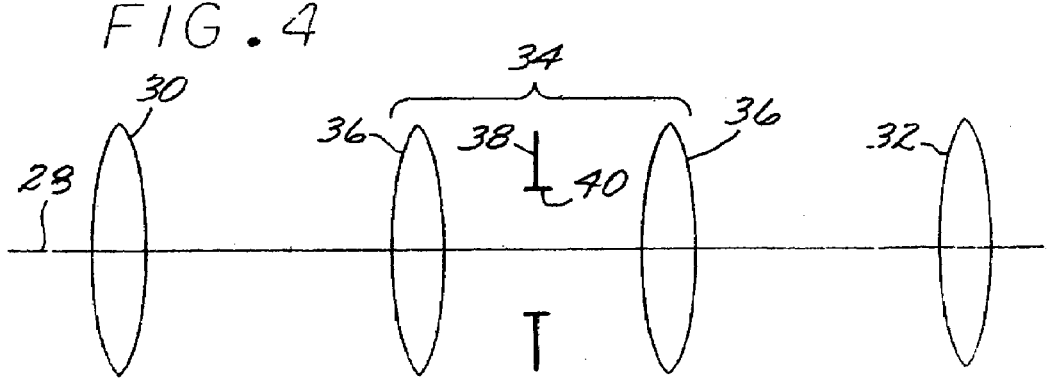
FIG. 4 is a schematic elevational view of the optics of a tumbler sighting device with the variable-position objective lens group and the exit stop in a first stop axial position.
Figure 5:
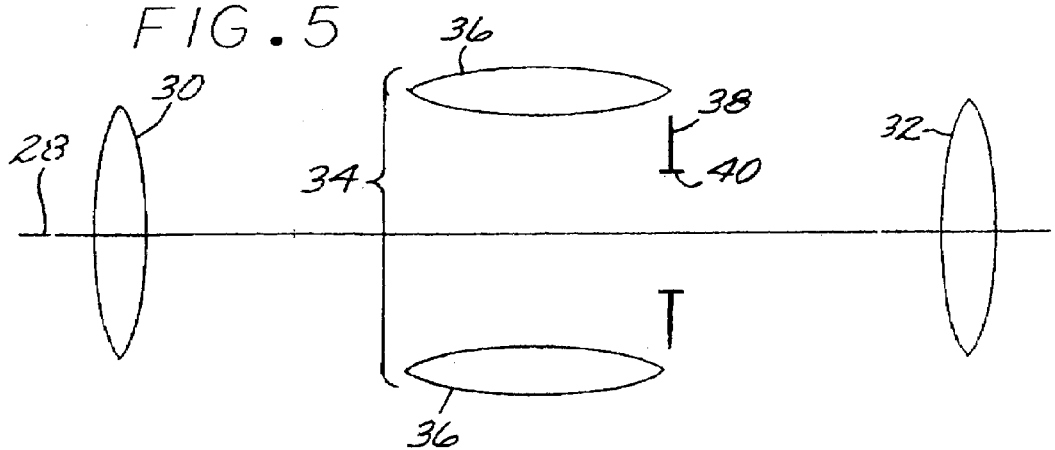
FIG. 5 is a schematic elevational view of the optics of FIG. 4 with the variable-position objective lens group and the exit stop in a second stop axial position.

For a tumbler-lens-group embodiment of FIGS. 4–5, in the arrangement illustrated in FIG. 4 the lenses 36 of the variable-postion objective lens group 34 are positioned on the optical axis 28 so that the optical axis 28 passes through each of the lenses 36, while in the position illustrated in FIG. 5 the variable-position objective lens group 34 is pivoted 90 degrees so that the lenses 36 are no longer positioned on the optical axis 28 and so that the optical axis 28 does not pass through each of the lenses 36. The tumbler-lens-group embodiment typically has only the two illustrated positions, which may be fully sufficient for many applications.

A mechanical aperture stop 38 lies on the optical axis 28 between the fixed-position objective lens group 30 and the eyepiece lens group 32, and in some cases between the variable-postion objective lens group 34 and the eyepiece lens group 32. The mechanical aperture stop 38 includes an aperture stop 40 positioned so that the optical axis 28 passes through the aperture stop 40. The aperture stop 40 defines the exit pupil through which the image of the target 26 is viewed.

Figure 6:
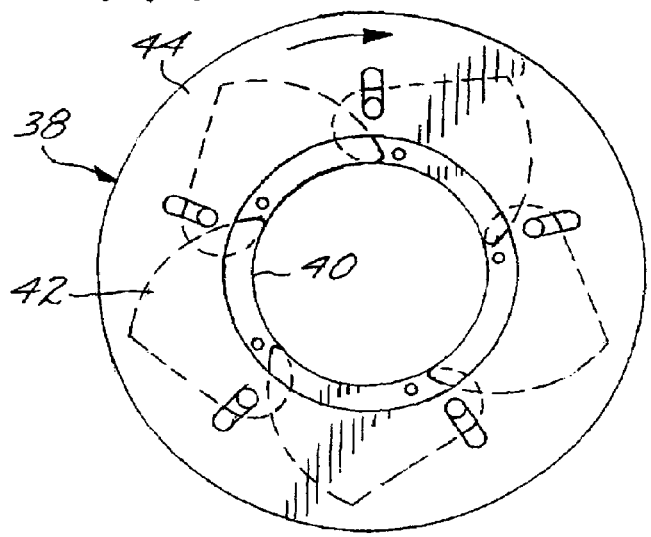
FIG. 6 is a schematic plan view of a mechanism for controlling the stop size.

A stop axial position and/or a stop size of the aperture stop 40 of the mechanical aperture stop 38 is varied according to the position of the variable-position objective lens group 34. That is, the entire mechanical aperture stop 38 may move parallel to the optical axis 28, as depicted in FIGS. 2–5. The stop size as determined by a diameter (measured perpendicular to the optical axis 28) of the aperture stop 40 may be changed, as depicted in FIG. 6. The change in the diameter may be accomplished by any operable approach. In the embodiment of FIG. 6, the mechanical aperture stop 38 includes a plurality of leaves 42 affixed at their inner ends to the stationary portion of the mechanical aperture stop 38 around the circumference of the aperture stop 40. An outer end of each leaf 42 is pivotably attached to an adjustment ring 44. Turning of the adjustment ring 44 pivots the leaves 42 inwardly or outwardly, causing the aperture stop 40 to be closed down or opened up. The operation of this embodiment is similar to that of the f-stop of a camera lens.

The stop axial position and/or the stop size of the mechanical aperture stop 38 may be changed independently of the variable-lens position of the variable-position objective lens group 34. Alternatively and preferably, the stop axial position and/or the stop size of the mechanical aperture stop 38, and the variable-lens position, are both changed automatically responsive to a user-operated magnification control. This preferred approach permits the stop axial position and/or the stop size of the mechanical aperture stop 38 to be automatically set at an optimum value as a function of the variable-lens position, with the user selecting only the single input value. In most situations, the user is concerned with keeping the image of the target 26 within the viewing area of the aperture stop 40. It would be difficult for the user to attempt to control and optimize the axial position and/or the stop size of the mechanical aperture stop 38 while simultaneously controlling the position of the variable-position objective lens group 34 and keeping the image of the target 26 within the viewing area of the aperture stop 40.

FIGS. 2–5 schematic illustrate basic structure and features. In practical applications, the coordinated movement of the stop axial position and/or the stop size of the mechanical aperture stop 38 and its aperture stop 40, and the position of the variable-position objective lens group 34, responsive to a user-operated magnification control, may be accomplished mechanically. For the zoom-lens configuration of FIGS. 2–3, the mechanical aperture stop 38 is mounted to a modified zoom mechanism within a housing 21, as is the variable-position objective lens group 34. The mechanical aperture stop 38 moves responsive to the magnification control that simultaneously sets the position and thence the magnification of the zoom lenses.

Figure 7:
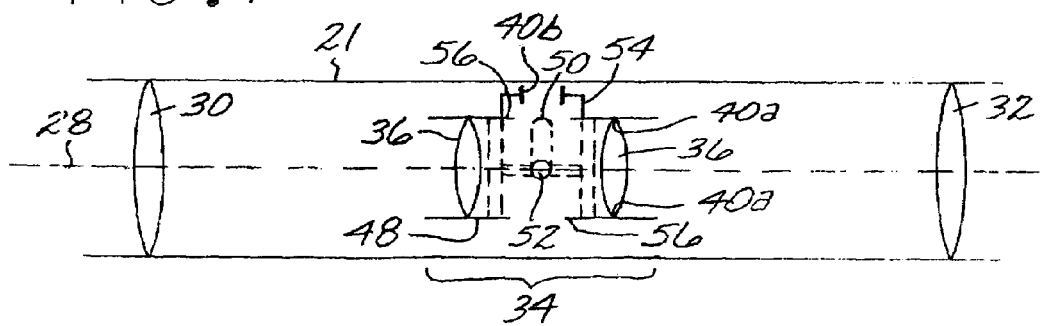
Figure 8:
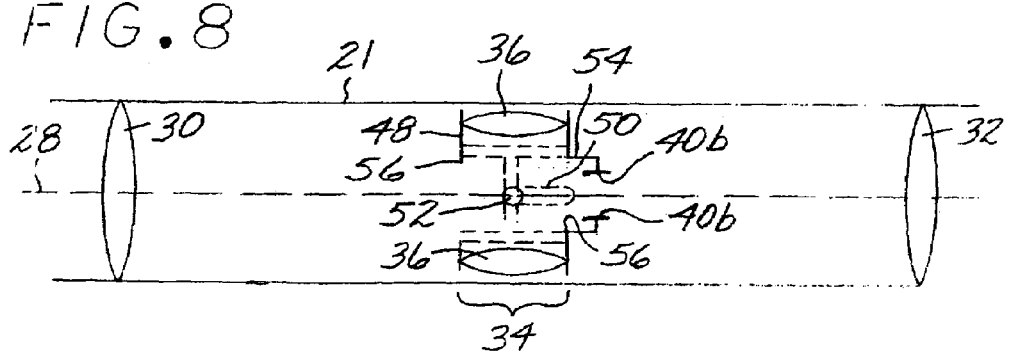

FIGS. 7–8 illustrate a practical approach to the tumbler-lens-group embodiment of FIGS. 4–5. In FIGS. 7–8, elements common with the schematic embodiment of FIGS. 4–5 are assigned the same reference numbers, and their prior discussion is incorporated here. In the embodiment of FIGS. 7–8, all of the lens groups 30, 32, and 34 are mounted within and to the housing 21. The lens groups 30 and 32 are mounted immovably to the housing 21. The lenses 36 of the variable-position objective lens group 34 are mounted to a pivotable variable-lens support 48. A manually operated magnification control 50 is connected to a pivoting axle 52 (which thus serves as a mechanical linkage) of the variable-lens support 48, and extends outside of the housing 21 to be manually accessible to the user of the sighting device 20. In this illustrated embodiment, the magnification control 50 extends outwardly on the side of the housing 21. With the magnification control 50 in the first position of FIG. 7, the lenses 36 lie on the optical axis 28, so that the light passing through the lens groups 30 and 32 also passes through the lenses 36. The lens mount of the rearward lens 36 acts as the mechanical aperture stop 40a. With the magnification control 50 in the second position of FIG. 8, the lenses 36 of the variable-position objective lens group 34 do not lie on the optical axis 28, so that the light passing through the lens groups 30 and 32 does not pass through the lenses 36. A separate mechanical stop structure 54 provides a mechanical aperture stop 40b through which the light passing through the lens groups 30 and 32, and through openings 56 in the sides of the variable-lens support 48, also passes. Manual movement of the magnification control 50 through 90 degrees thus either inserts the lenses 36 and assocaited aperture stop 40a into the light path along the optical axis 28, or removes the lenses 36 and aperture stop 40a and inserts the aperture stop 40b into the light path along the optical axis 28. The tumbler approach of FIGS. 4–5 and 7–8 allows the user to select between two fixed magnification settings, while the zoom approach of FIGS. 2–3 allows the user to select a variable range of magnification settings.

The present approach allows an optimum position and/or size of the exit pupil, as defined by the aperture stop 40 of the mechanical aperture stop 38, to be established according to the selected position and magnification of the variable-position objective lens group 34. The user consequently views the scene through an optimum position and size of the exit pupil to facilitate initial visual acquisition of the target 26 as well as continuing and continuous visualization of the target 26 when the magnification of the sighting device is changed.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sighting device comprising:
    a fixed-position objective lens group lying on an optical axis;
    an eyepiece lens group lying on the optical axis;
    a variable-position objective lens group lying on the optical axis and positioned between the fixed-position objective lens group and the eyepiece lens group, wherein the variable-position objective lens group is a tumbler lens group, and wherein a variable-lens position of the variable-position objective lens group relative to the eyepiece lens group may be controllably varied; and
    a mechanical aperture stop lying on the optical axis between the fixed-position objective lens group and the eyepiece lens group, wherein a stop axial position or a stop size of the mechanical aperture stop is varied according to the position of the variable-position objective lens group.

2. The sighting device of claim 1, wherein the stop axial position of the mechanical aperture stop is varied automatically responsive to the position of the variable-position objective lens group.

3. The sighting device of claim 1, wherein the stop size of the mechanical aperture stop is varied automatically responsive to the position of the variable-position objective lens group.

4. The sighting device of claim 1, wherein the stop axial position or the stop size of the mechanical aperture stop, and the variable-lens position, are both changed automatically responsive to a user-operated magnification control.

5. The sighting device of claim 1, further including
    a mechanical linkage that varies the stop axial position or the stop size of the mechanical aperture stop, and the variable-lens position, responsive to a user-operated magnification control.

6. The sighting device of claim 1, further including
    a housing in which the fixed-position objective lens group, the eyepiece lens group, the variable-position objective lens group, and the mechanical aperture stop are mounted.

7. The sighting device of claim 1, further including
    a housing in which the fixed-position objective lens group, the eyepiece lens group, the variable-position objective lens group, and the mechanical aperture stop are mounted, and
    an attachment on the housing adapted to attach the housing to a rifle.

8. The sighting device of claim 1, further including
    a housing in which the fixed-position objective lens group, the eyepiece lens group, the variable-position objective lens group, and the mechanical aperture stop are mounted, and
    a magnification control that sets the stop axial position or the stop size of the mechanical aperture stop, and the variable-lens position, and wherein the magnification control is manually accessible outside of the housing.

9. A sighting device comprising:
    a housing;
    a fixed-position objective lens group within the housing and lying on an optical axis that extends lengthwise through the housing;
    an eyepiece lens group within the housing and lying on the optical axis;
    a magnification control that is manually accessible on an exterior of the housing;
    a variable-position objective lens group within the housing and lying on the optical axis and positioned between the fixed-position objective lens group and the eyepiece lens group, wherein the variable-position objective lens group is a tumbler lens group, and wherein a variable-lens position of the variable-position objective lens group relative to the eyepiece lens group is controllable responsive to a movement of the magnification control; and
    an aperture stop structure within the housing and lying on the optical axis between the fixed-position objective lens group and the eyepiece lens group, wherein a pupil axial position or a pupil size of the aperture stop structure is controllable responsive to the movement of the magnification control.

10. The sighting device of claim 9, wherein the stop axial position of the mechanical aperture stop is controllable responsive to the movement of the magnification control.

11. The sighting device of claim 9, wherein the stop size of the mechanical aperture stop is controllable responsive to the movement of the magnification control.

12. A sighting device comprising:
a fixed-position objective lens group lying on an optical axis;
an eyepiece lens group lying on the optical axis;
a variable-position tumbler lens group positioned between the fixed-position objective lens group and the eyepiece lens group;
a pivotable tumbler-lens-group support to which the tumbler lens group is mounted;
a mechanical aperture stop lying on the optical axis between the fixed-position objective lens group and the eyepiece lens group, wherein a stop position or a stop size of the mechanical aperture stop is varied according to the position of the tumbler lens group; and
a magnification control that controllably pivots the tumbler-lens-group support to controllably position the tumbler lens group to lie on the optical axis or to controllably position the tumbler lens group to lie off of the optical axis.

13. The sighting device of claim 12, wherein the mechanical aperture stop is supported on the tumbler-lens-group support.

14. The sighting device of claim 12, wherein the stop position of the mechanical aperture stop is varied automatically responsive to the position of the variable-position tumbler lens group.

15. The sighting device of claim 12, further including
a housing in which the fixed-position objective lens group, the eyepiece lens group, the variable-position tumbler lens group, and the mechanical aperture stop are mounted.

16. The sighting device of claim 12, further including
a housing in which the fixed-position objective lens group, the eyepiece lens group, the variable-position tumbler lens group, and the mechanical aperture stop are mounted, and
an attachment on the housing adapted to attach the housing to a rifle.

* * * * *